United States Patent
Xiang et al.

(10) Patent No.: US 10,091,718 B2
(45) Date of Patent: Oct. 2, 2018

(54) SYSTEM AND METHOD FOR WIRELESS NETWORK SELECTION

(71) Applicant: FutureWei Technologies, Inc., Plano, TX (US)

(72) Inventors: Zhixian Xiang, Plano, TX (US); Weisheng Jin, Shanghai (CN); Youyang Yu, Shanghai (CN); Guowei Ouyang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 2 days.

(21) Appl. No.: 14/226,415

(22) Filed: Mar. 26, 2014

(65) Prior Publication Data

US 2014/0293981 A1 Oct. 2, 2014

Related U.S. Application Data

(60) Provisional application No. 61/805,421, filed on Mar. 26, 2013.

(51) Int. Cl.
| | | |
|---|---|---|
| *H04W 48/18* | (2009.01) | |
| *H04W 4/00* | (2018.01) | |
| *H04W 4/02* | (2018.01) | |
| *H04W 48/14* | (2009.01) | |

(52) U.S. Cl.
CPC .......... *H04W 48/18* (2013.01); *H04W 48/14* (2013.01)

(58) Field of Classification Search
CPC .............................. H04W 48/18; H04W 88/08
USPC ....................................................... 370/328
See application file for complete search history.

(56) References Cited

U.S. PATENT DOCUMENTS

| | | | |
|---|---|---|---|
| 2005/0148332 A1 | 7/2005 | Buckley et al. | |
| 2005/0249171 A1* | 11/2005 | Buckley | H04W 48/18 370/338 |
| 2007/0004405 A1 | 1/2007 | Buckley et al. | |
| 2009/0049526 A1* | 2/2009 | Zhang | H04L 63/101 726/4 |
| 2012/0093031 A1 | 4/2012 | Wang et al. | |
| 2012/0309447 A1* | 12/2012 | Mustajarvi | H04W 48/18 455/524 |

(Continued)

FOREIGN PATENT DOCUMENTS

| | | |
|---|---|---|
| CN | 101730202 A | 6/2010 |
| WO | 2011050835 A1 | 5/2011 |

(Continued)

OTHER PUBLICATIONS

WiFi Alliance, "Wi-Fi Alliance Technical Committee Hotspot 2.0 Technical Task Group," Hotspot 2.0 (Release 2) Technical Specification, Version 2.10, Apr. 9, 2013, 168 pgs.

(Continued)

*Primary Examiner* — Asad Nawaz
*Assistant Examiner* — Jason Harley
(74) *Attorney, Agent, or Firm* — Slater Matsil, LLP

(57) ABSTRACT

In one embodiment, a method for wireless network selection includes obtaining, by a user equipment (UE) from a visitor access network discovery and selection function (V-ANDSF) server, a visitor policy and creating a wireless local area network (WLAN) priority list in accordance with the visitor policy, a home policy, and a priority indicator. The method also includes selecting a WLAN from the priority list as a selected network.

20 Claims, 2 Drawing Sheets

(56) References Cited

U.S. PATENT DOCUMENTS

2014/0010222 A1* 1/2014 Chen .................. H04W 48/16
                                                            370/338
2014/0204903 A1* 7/2014 Kim et al. ................... 370/331

FOREIGN PATENT DOCUMENTS

WO          2011149533 A1    12/2011
WO          2011150986 A1    12/2011

OTHER PUBLICATIONS

PCT International Search Report and Written Opinion, International Application No. PCT/US2014/031915, Applicant Huawei Technologies Co., LTD, dated Aug. 22, 2014, 7 pgs.
"3rd Generation Partnership Project; Technical Specification Group Services and System Aspects; WLAN Network Selection for 3GPP Terminals; Stage 2 (Release 12)," Technical Report, 3GPP TR 23.865, V0.5.0, Feb. 2013, pp. 30.
"3rd Generation Partnership Project; Technical Specification Group Services and System Aspects; Architecture enhancements for non-3GPP accesses (Release 13)," Technical Specification, 3GPP TS 23.402, V13.0.0, Dec. 2014, pp. 290.
"3rd Generation Partnership Project; Technical Specification Group Services and System Aspects; Architecture enhancements for non-3GPP accesses (Release 12)," Technical Specification, 3GPP TS 23.402, V12.0.0, Mar. 2013, pp. 253.
"3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)," Technical Specification, 3GPP TS 24.234, V11.3.0, Jun. 2012, pp. 41.
"3rd Generation Partnership Project; Technical Specification Group Core Network and Terminals; 3GPP System to Wireless Local Area Network (WLAN); Interworking Management Object (MO); (Release 11)," Technical Specification, TS 24.235, V11.1.0, Jun. 2012, pp. 19.
"3rd Generation Partnership Project; Technical Specification Group Core Network and Terminals; Access Network Discovery and Selection Function (ANDSF) Management Object (MO) (Release 12)," Technical Specification, 3GPP TS 24.312, V12.0.0, Mar. 2013, pp. 173.
"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 9: Interworking with External Networks," IEEE Computer Society, IEEE STD 802.11u-2011, Feb. 25, 2011, pp. 208.
Huawei, "Discussion on WLAN Identifier Lists within ANDSF MO," 3GPP TSG CT WG1 Meeting #58, C1-091906, Apr. 20-24, 2009, 2 pgs.
"Home and Visited ANDSF Policies Conflicts Resolution," 3GPP TSG SA WG2 Meeting #74, S2-094625, Jul. 2009, 3 pgs.
ZTE, "Discussion about Resolving the Potential Conflicts Between the Policies from H-ANDSF and V-ANDSF," 3GPP TSG SA WG2 Meeting #73, SA WG2 Temporary Document, TD S2-093471, May 11-15, 2009, 2 pgs.
3rd Generation Partnership Project; Technical Specificatino Group Core Network and Terminals; Access to the 3GPP Evolved Packet Core (EPC) via non-3GPP access networks; Stage 3 (Release 12), 3GPP TS 24.302 V12.0.0, Mar. 2013, 61 pages.

* cited by examiner

SYSTEM AND METHOD FOR WIRELESS NETWORK SELECTION

This application claims the benefit of U.S. Provisional Application Ser. No. 61/805,421 filed on Mar. 26, 2013, and entitled "System and Method for WLAN Selection with a Combined Candidate List," which application is hereby incorporated herein by reference.

TECHNICAL FIELD

The present invention relates to a system and method for wireless communications, and, in particular, to a system and method for wireless network selection.

BACKGROUND

Wireless local area networks (WLANs) are used by cellular operations to meet the market demand cellular services. WLAN access may be integrated into existing cellular systems. Many mobile devices have both WLAN and cellular capabilities. It is desirable to have a method of selecting which WLAN network to select for a wireless device when more than one WLAN is available. When a user equipment (UE) is in a visiting network, it may want to connect to that network. For example, a UE from an American network may want to connect to a network in China when the UE's owner is visiting China from America, and vice versa.

SUMMARY

An embodiment method for wireless network selection includes obtaining, by a user equipment (UE) from a visitor access network discovery and selection function (V-ANDSF) server, a visitor policy and creating a wireless local area network (WLAN) priority list in accordance with the visitor policy, a home policy, and a priority indicator. The method also includes selecting a WLAN from the priority list as a selected network.

Another embodiment method for wireless network selection includes obtaining, by a user equipment (UE) from a visitor access network discovery and selection function (V-ANDSF) server, a visitor policy and creating a wireless local area network (WLAN) priority list in accordance with the visitor policy, a home policy, and a priority indicator, where the home policy includes a first network, where the visitor policy includes a second network, and where the priority list includes the first network and the second network. The method also includes selecting a WLAN from the priority list as a selected network.

An embodiment user equipment (UE) includes a processor and a computer readable storage medium storing programming for execution by the processor. The programming includes instructions to obtain, from a visitor access network discovery and selection function (V-ANDSF) server, a visitor policy and create a wireless local area network (WLAN) priority list in accordance with the visitor policy, a home policy, and a priority indicator, where the priority indicator is stored in the UE. The programming also includes instructions to select a WLAN from the priority list as a selected network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an example, visitor access network discovery and selection function (V-ANDSF) takes precedence over home access network discovery and selection function (H-ANDSF). If V-ANDSF takes a higher priority, a user equipment (UE) may select an undesirable wireless local area network (WLAN) when the UE moves to an area which is overlapped by both a visitor network and home network. For example, if network A's UE roams into visited network B, the UE obtains the V-ANDSF policy from network B, and uses this policy to select a network. When the UE then moves to an area covered by both network A and network B, and the UE still only uses network B's policy, the UE may pick up WLAN C, while network A would be the best (or network A preferred) option.

An embodiment method involves UE selection of a WLAN. The UE has a priority indicator which the UE uses to determine whether to use a visitor policy or a home policy when deciding which WLAN to connect to. The priority indicator may indicate that the visitor policy is always used, that the home policy is always used, or that in some situations the home policy is used and other situations the visitor policy is used.

In another embodiment, when the UE selects its first WLAN after power up, or when the previous WLAN to which the UE was connected is its home network, then the UE only uses a home access network discovery and selection function (H-ANDSF) policy to create a candidate WLAN list. When the previous WLAN network is in a visited network, and the UE still has the valid visitor access network discovery and selection function (V-ANDSF) policy from that visitor network, the UE runs the V-ANDSF policy and the H-ANDSF policy separately to find the matched WLANs in accordance with each access network discovery and selection function (ANDSF) policy. The UE forms two separate candidate WLAN lists. Based on a priority indication, the UE puts the lower priority list after the higher priority list to form a combined candidate WLAN. Then, the UE uses this combined candidate list to conduct further home public land mobile network (HPLMN) selection to select the best matched WLAN.

Figure 1:
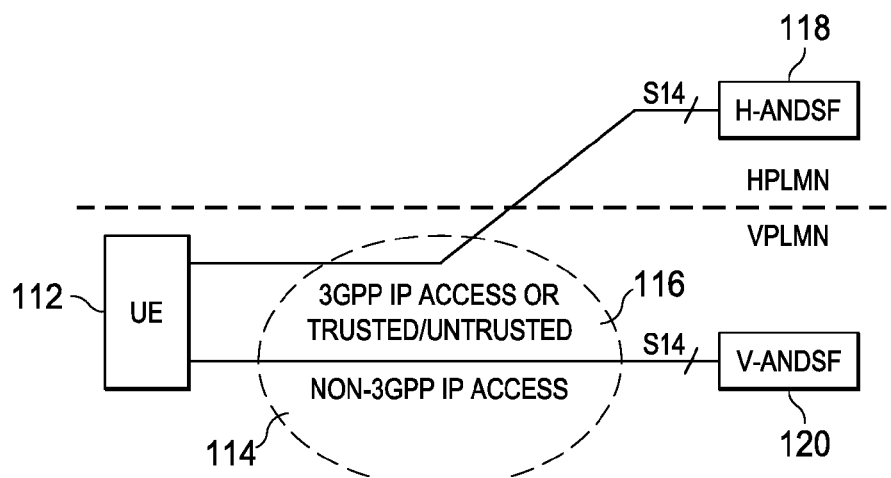
FIG. 1 illustrates an embodiment system for wireless network selection.

FIG. 1 illustrates a UE interacting with an ANDSF server through an interface. The ANDSF server helps the UE to discover non-3GPP networks, such as WLANs. UE 112 interacts with ANDSF through an S14, interface using internet protocol (IP) level signaling. UE 112 obtains the network selection policies from H-ANDSF server 118 and V-ANDSF server 120. H-ANDSF server 118 contains the H-ANDSF or home policy, while V-ANDSF server 120 contains the V-ANDSF or visitor policy. Communications with H-ANDSF server 118 are through $3^{rd}$ generation partnership protocol (3GPP) IP access 116. UE 112 communicates with V-ANDSF server 120 using non-3GPP IP access 114.

In one embodiment, a UE stores a priority indicator. When the UE enters a visitor network, it accesses its priority indicator to decide which network to connect to. For example, the priority indicator may indicate that the UE should follow the visitor policy. In another example, the priority indicator indicates that the UE should follow the home policy. Alternatively, the priority indicator may indicate circumstances when the home policy is followed, and circumstances when the visitor policy is followed. For example, it may contain a list of preferred visitor networks. When the visitor network is on the list of preferred visitor networks, the UE gives priority to the visitor priority. When the visitor is not on the list, the UE gives priority to the home policy.

The visitor policy may be populated to the UE using push mode or pull mode. In push mode, V-ANDSF pushes the policy to the UE, while in pull mode, the UE requests the policy from V-ANDSF. When the UE roams to a visitor network, the visitor network's V-ANDSF may provision the local policy to the UE.

In an embodiment, a candidate WLAN list is a combination of the H-ANDSF candidate list and the V-ANDSF candidate list while roaming. The relative priorities of the two candidate WLAN lists are decided by a priority indicator. The priority indicator may be provided to the UE through H-ANDSF or interworking WLAN management object (I-WLAN MO) to indicate the relative priority of the H-ANDSF candidate list and the V-ANDSF candidate list. Alternatively, the priority indicator is set incident to manufacturing.

In an embodiment, the UE always runs the H-ANDSF policy, even when the UE is roaming in a visited network if the I-WLAN HPLMN Priority Indication is set. When the UE receives a V-ANDSF policy from the visited network, and the HPLMN facilitates V-ANDSF policy take precedence over the H-ANDSF policy. On the other hand, I-WLAN HPLMN Priority Indication is not set, the UE creates a WLAN candidate list derived from both V-ANDSF and H-ANDSF policies. The UE appends the candidate WLANs from H-ANDSF after the matched WLANs from V-ANDSF.

In one example, after applying the V-ANDSF and H-ANDSF policies, two candidate lists are formed. One candidate list, from the V-ANDSF policy, contains WLAN-2, WLAN-4, WLAN-3, and WLAN-1. The other candidate list, from the H-ANDSF policy, contains WLAN-5, WLAN2, and WLAN-6. WLAN-5 is the home policy's WLAN. V-ANDSF's priority indication is set, so V-ANDSF has a higher priority than H-ANDSF. Thus, a combined candidate list is WLAN-2, WLAN-4, WLAN-3, WLAN-1, WLAN-5, WLAN-2, and WLAN-6. This combined candidate list is used for HPLMN selection to determine which WLAN to connect to.

Figure 2:
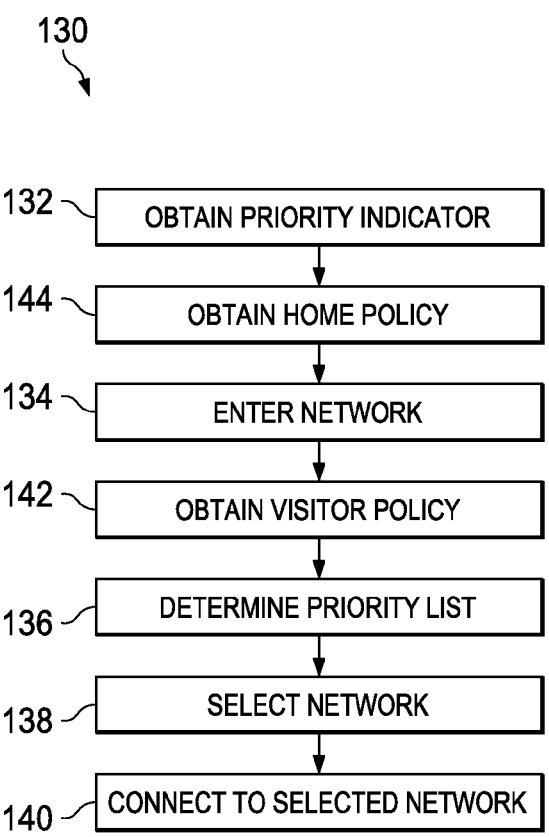
FIG. 2 illustrates an embodiment method for selecting a wireless network.

FIG. 2 illustrates flowchart 130 for a method of selecting a wireless network. Initially, in step 132, a UE receives a priority indicator. In one example, the priority indicator is stored in the UE incident to manufacturing. Alternatively, the priority indicator is received from an H-ANDSF server during operation. The priority indicator may indicate that a visitor policy always take priority over the home policy. In another example, the priority indicator indicates that the home policy always take priority over the visitor policy. In an additional example, the priority indicator indicates that the home policy takes priority some of the time and the visitor policy takes priority other times. For example, the priority indicator includes a list of preferred visitor networks. If the visitor network is on the list of preferred visitor networks, the UE gives priority to the visitor's policy. If the visitor network is not on the list of preferred visitor networks, the UE gives priority to the home policy.

The UE stores the home policy in step 144. Obtaining the home policy may occur before, after, or simultaneously with obtaining the priority indicator. In one example, the home policy is stored during manufacturing. Alternatively, the UE receives the home policy from the home operator network. For example, the UE receives the home policy from an H-ANDSF during operation. The UE may receive the home policy from an H-ANDSF in a push policy, initiated by the H-ANDSF. In another example, the UE requests the home policy from the H-ANDSF in a pull mode. In an additional example, the home policy is received through another over-air provision server with another provisioning protocol. The home policy may be an ordered list of home WLAN networks.

Next, in step 134, the UE enters a network. The UE may enter a visitor network or the home network. The visitor network may be in an area where the home network does not provide coverage. In one example, the visitor network is in another country. The UE may enter the visitor network from the home network or from another visitor network. In another example, the UE enters the home network.

The UE obtains the visitor policy in step 142. The UE may request the visitor policy from a V-ANDSF in a pull mode. Alternatively, the UE receives the visitor policy from the V-ANDSF in a push mode. The visitor policy may be an ordered list of WLAN networks.

Then, in step 136, the UE determines a priority list. In one example, the priority list is determined in accordance with the priority indicator. The visitor policy may be used. Alternatively, the home policy is used. In another example, the visitor policy is used in some situations and the home policy is used in other situations. For example, the visitor policy is used when the visitor network is on a list of preferred visitor networks, and the home policy is used when the visitor network is not on a list of preferred visitor providers.

In another example, the home policy and the visitor policy are combined to make a list that contains networks from the home policy and the visitor policy. Priority is given to either the home policy or the visitor policy. WLAN networks of the preferred policy are placed first. In one example, the visitor policy has priority over the home policy, and the WLAN networks on the visitor policy are listed first. In another example, the home policy has priority over the visitor policy, and the WLAN networks on the home policy are listed first. The WLAN networks of the home policy are placed after the visitor policy. Alternatively, the lists are interleaved.

Next, in step 138, the UE selects a WLAN network to join. For example, the UE selects the first entry in the priority list. When that WLAN network is available, the UE joins that network. When that network is not available, the UE tries to connect to the next WLAN network on the list.

Finally, in step 140, the UE connects to the selected network. The UE then uses that WLAN network to transmit and receive data.

Figure 3:
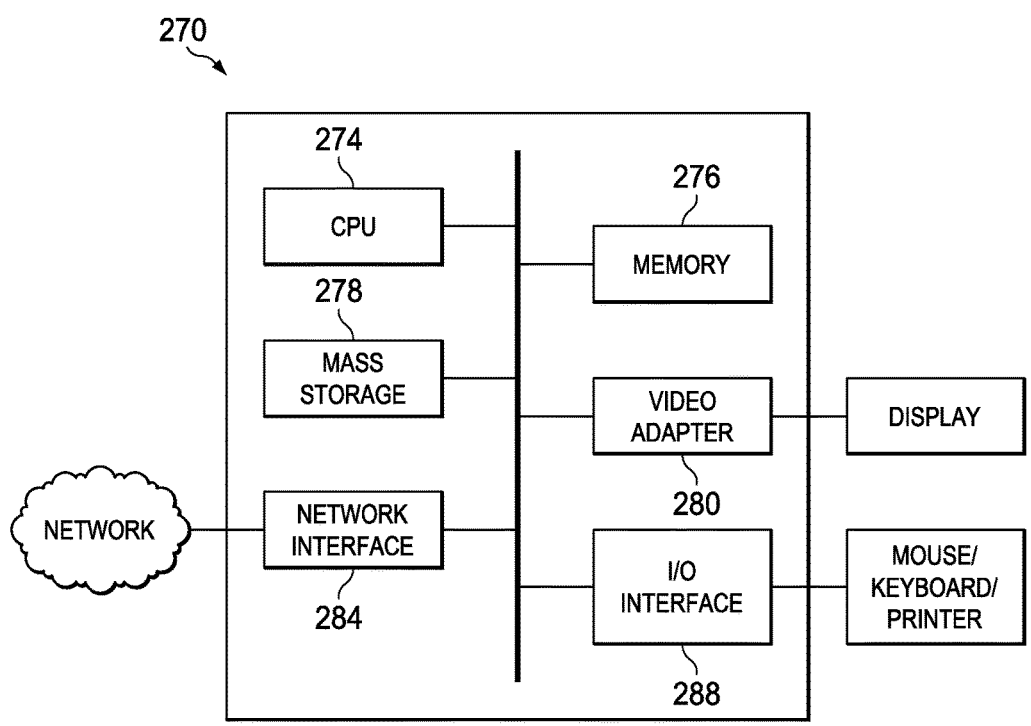
FIG. 3 illustrates a block diagram of an embodiment general-purpose computer system.

FIG. 3 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless network selection, the method comprising:

obtaining, by a user equipment (UE) from a visitor access network discovery and selection function (V-ANDSF) server, a visitor policy of a visitor network;

receiving, by the UE from a home access network discovery and selection function (H-ANDSF) server, a priority indicator comprising a list of preferred visitor networks;

determining whether the visitor network is on the list of preferred visitor networks;

creating a wireless local area network (WLAN) priority list in accordance with the visitor policy, a home policy, and the priority indicator, wherein creating the WLAN priority list comprises setting the WLAN priority list to the visitor policy in response to the visitor network being on the list of preferred visitor networks of the priority indicator received from the H-ANDSF server, and setting the WLAN priority list to the home policy in response to the visitor network not being on the list of preferred visitor networks of the priority indicator received from the H-ANDSF server, wherein the visitor policy prioritizes visitor WLANS of the visitor policy over home WLANs of the home policy and the home policy prioritizes the home WLANS of the home policy over the visitor WLANS of the visitor policy, wherein the visitor policy comprises an ordered list of WLANs, and wherein the home policy comprises an ordered list of home WLANs;

selecting a WLAN from the WLAN priority list as a selected network;

connecting, by the UE, to the selected network; and communicating, by the UE, with the selected network.

2. The method of claim 1, wherein creating the WLAN priority list comprises setting the WLAN priority list to the home policy.

3. The method of claim 1, wherein creating the WLAN priority list comprises setting the WLAN priority list to the visitor policy.

4. The method of claim 1, wherein creating the WLAN priority list comprises setting the WLAN priority list to the visitor policy or the home policy in accordance with the priority indicator.

5. The method of claim 4, wherein the priority indicator comprises a list of priority networks, and wherein creating the WLAN priority list comprises setting the WLAN priority list to the visitor policy when the list of priority networks indicates a visitor network, and to the home policy when the list of priority networks does not indicate the visitor network.

6. The method of claim 1, further comprising entering a visitor network before obtaining the visitor policy.

7. The method of claim 1, further comprising obtaining, by the UE from a home network, the home policy.

8. The method of claim 7, wherein obtaining the home policy comprises obtaining, by the UE from the H-ANDSF server, the home policy.

9. A method for wireless network selection, the method comprising:
   obtaining, by a user equipment (UE) from a visitor access network discovery and selection function (V-ANDSF) server, a visitor policy of a visitor network;
   receiving, by the UE from a home visitor access network discovery and selection function (H-ANDSF) server, a priority indicator comprising a list of preferred visitor networks;
   determining whether the visitor network is on the list of preferred visitor networks;
   creating a wireless local area network (WLAN) priority list in accordance with the visitor policy, a home policy, and the priority indicator, wherein creating the WLAN priority list comprises setting the WLAN priority list to the visitor policy in response to the visitor network being on the list of preferred visitor networks of the priority indicator received from the H-ANDSF server, and setting the WLAN priority list to the home policy in response to the visitor network not being on the list of preferred visitor networks of the priority indicator received from the H-ANDSF server, wherein the visitor policy prioritizes visitor WLANS of the visitor policy over home WLANs of the home policy and the home policy prioritizes the home WLANS of the home policy over the visitor WLANS of the visitor policy, wherein the home policy comprises a first network, wherein the visitor policy comprises a second network, and wherein the WLAN priority list comprises the first network and the second network, wherein the visitor policy comprises an ordered list of WLANs, and wherein the home policy comprises an ordered list of home WLANs;
   selecting a WLAN from the WLAN priority list as a selected network;
   connecting, by the UE, to the selected network; and
   communicating, by the UE, with the selected network.

10. The method of claim 9, wherein the WLAN priority list comprises the home policy and the visitor policy.

11. The method of claim 10, wherein the priority indicator indicates that the home policy has a higher priority than the visitor policy.

12. The method of claim 9, further comprising entering a visitor network before obtaining the visitor policy.

13. The method of claim 9, further comprising obtaining, by the UE from the H-ANDSF server, the home policy.

14. A user equipment (UE) comprising:
   a processor; and
   a non-transitory computer readable storage medium storing programming for execution by the processor, the programming including instructions to:
      obtain, from a visitor access network discovery and selection function (V-ANDSF) server, a visitor policy of a visitor network,
      receive, from a home access network discovery and selection function (H-ANDSF) server, a priority indicator comprising a list of preferred visitor networks,
      determine whether the visitor network is on the list of preferred visitor networks,
      create a wireless local area network (WLAN) priority list in accordance with the visitor policy, a home policy, and the priority indicator, wherein the priority indicator is stored in the UE, wherein creating the WLAN priority list comprises setting the WLAN priority list to the visitor policy in response to the visitor network being on the list of preferred visitor networks of the priority indicator received from the H-ANDSF server, and setting the WLAN priority list to the home policy in response to the visitor network not being on the list of preferred visitor networks of the priority indicator received from the H-ANDSF server, wherein the visitor policy prioritizes visitor WLANS of the visitor policy over home WLANs of the home policy and the home policy prioritizes the home WLANS of the home policy over the visitor WLANS of the visitor policy, wherein the visitor policy comprises an ordered list of WLANs, and wherein the home policy comprises an ordered list of home WLANs,
      select a WLAN from the WLAN priority list as a selected network,
      connect to the selected network, and
      communicate with the selected network.

15. The UE of claim 14, wherein the instructions to create the priority list comprise instructions to set the WLAN priority list to the visitor policy or the home policy in accordance with the priority indicator.

16. The UE of claim 15, wherein the priority indicator comprises a list of priority networks, and wherein creating the WLAN priority list comprises setting the WLAN priority list to the visitor policy when the list of priority networks indicates a visitor network, and to the home policy when the list of priority networks does not indicate the visitor network.

17. The UE of claim 14, wherein the instructions to create the WLAN priority list comprise instructions to set the WLAN priority list to the visitor policy.

18. The UE of claim 14, wherein the instructions to create the WLAN priority list comprise instructions to set the WLAN priority list to the home policy.

19. The method of claim 9, wherein the priority indicator comprises a list of priority networks, and wherein creating the WLAN priority list comprises setting the WLAN priority list to the visitor policy when the list of priority networks indicates a visitor network, and to the home policy when the list of priority networks does not indicate the visitor network.

20. The method of claim 9, wherein creating the WLAN priority list comprises setting the WLAN priority list to the visitor policy.

\* \* \* \* \*